United States Patent [19]

Burgess

[11] 4,378,719
[45] Apr. 5, 1983

[54] SAW CHAIN CONNECTOR

[76] Inventor: Vernon J. Burgess, 1976 Club View Dr., Highland, Mich. 48031

[21] Appl. No.: 212,812

[22] Filed: Dec. 4, 1980

Related U.S. Application Data

[63] Continuation of Ser. No. 5,341, Jan. 22, 1979, abandoned.

[51] Int. Cl.³ .............................................. B27B 33/14
[52] U.S. Cl. ........................................ 83/831; 83/834; 474/222
[58] Field of Search ................ 83/831, 830, 832, 833, 83/834; 74/254, 251, 245

[56] References Cited

U.S. PATENT DOCUMENTS

| | | | |
|---|---|---|---|
| 381,853 | 4/1888 | Schuman | 74/251 R |
| 2,744,548 | 5/1956 | Stephenson | 83/834 |
| 2,747,624 | 5/1956 | Cox | 83/831 |
| 2,792,862 | 5/1957 | Emmons | 408/212 |
| 3,519,039 | 7/1970 | Ehlen | 83/834 |
| 3,835,721 | 9/1974 | Hoffstetter | 74/245 R |

FOREIGN PATENT DOCUMENTS 534579  1/1922  France .................................. 74/254

Primary Examiner—Donald R. Schran
Attorney, Agent, or Firm—Gifford, VanOphem, Sheridan & Sprinkle

[57] ABSTRACT

The invention provides a saw chain comprising connecting links made of relatively inexpensive nonhardened metal and saw tooth links made of an extremely hard material, such as carbide, which maintains the sharpness of the saw tooth links despite prolonged use. The connecting links are pivotally secured through registering apertures in the links. In one form of the invention the pivot pin is separable into a female portion and a male portion to permit the replacement of individual saw tooth links on the saw chain.

5 Claims, 4 Drawing Figures

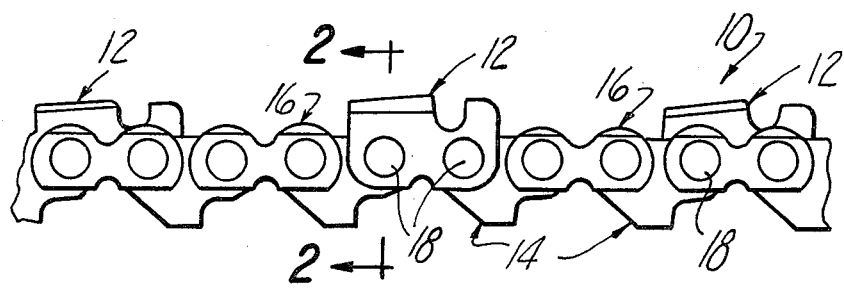
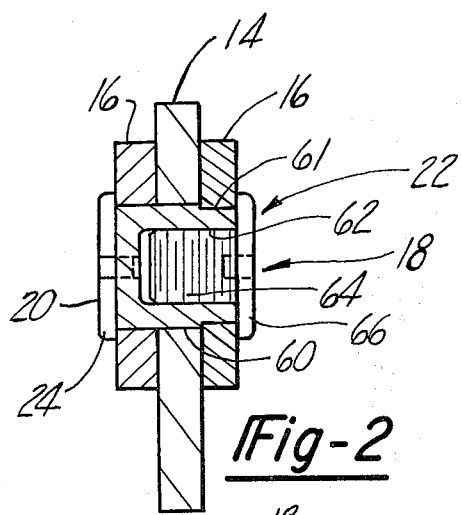
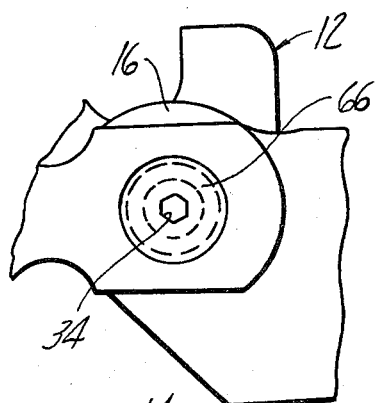
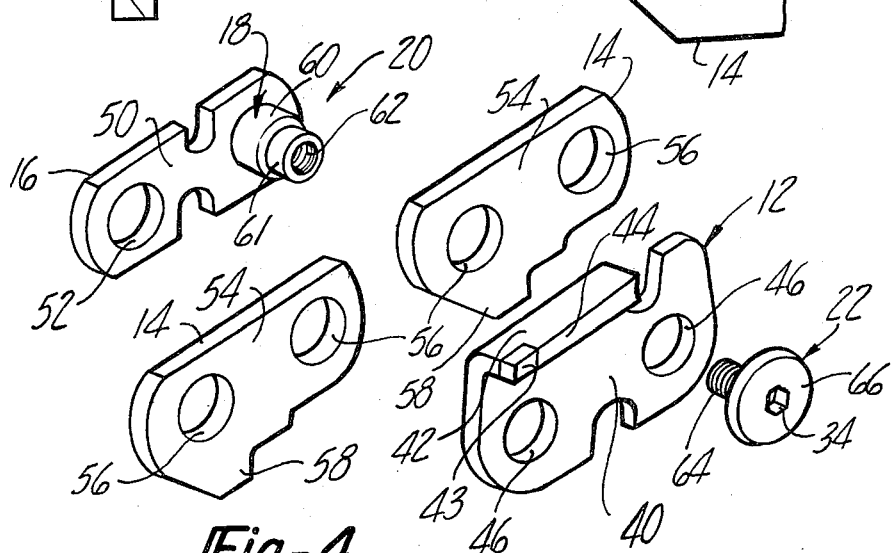

SAW CHAIN CONNECTOR

CROSS REFERENCE TO RELATED APPLICATIONS

This is a continuation of application Ser. No. 5,341, filed Jan. 22, 1979, now abandoned.

BACKGROUND OF THE INVENTION

I. Field of the Invention

The invention relates generally to saw chains, and more particularly, to a saw chain having connecting links constructed of a nonhardened metal and tooth links constructed of extremely hard material.

II. Description of the Prior Art

Saw chains have long been known in the prior art and it is commonly known that the saw teeth of these chains rapidly become dull and must be resharpened. Generally, the saw teeth links are made of only a relatively hard metal so the blades of the saw tooth link can be ground or filed to restore a sharp cutting edge. Filing the saw chain teeth to restore their sharpness, however, is a time consuming and tedious operation.

Moreover, repeated grinding of the blades eventually wears out the saw tooth links. When the saw tooth links become overly worn, the entire saw must be replaced which in practice is very expensive to accomplish.

Another disadvantage of the previously known saw chains is that the connecting links as well as the saw tooth links are made of expensive and relatively hard metal, e.g. hardened steel, even though the connecting links undergo little wear. However, such relatively hard metal is expensive and thus increases the cost of the saw chain.

SUMMARY OF THE PRESENT INVENTION

The present invention overcomes the above-mentioned disadvantages of the previously known saw chains by providing a saw chain in which sharpening of the saw tooth links is rarely, if ever, required and which is inexpensive in construction.

In brief, the saw tooth links are made from a very hard material, preferably carbide, so that the saw chain can be used for prolonged periods without dulling the saw tooth links. Since sharpening of the saw tooth links is only infrequently, if ever, required, the saw tooth links do not become overly worn by resharpening as in the previously known saw chains so that replacement of the entire saw chain is virtually never required.

Conversely, the connecting links between the saw tooth links are constructed of nonhardened metal preferably nonhardened steel. The connecting links for the saw chain of the instant invention are substantially less expensive in construction than the hardened metal connecting links used in the previously known saw chains and thus substantially reduce the overall cost of the saw chain of the present invention. Moreover, since the connecting links undergo only minimal wear during a cutting operation so that the use of inexpensive metal for the connecting links does not adversely affect the durability of the saw chain.

The connecting links are pivotally secured to and between the tooth links by a pivot pin. In one form of the invention, the pivot pin comprises a male portion which threadably and detachably engages a female portion. This construction of the pivot pin thus enables the saw tooth links to be individually replaced when desired, without replacement of the entire saw chain. Such individual replacement of the tooth links is desirable when, for example, the saw tooth becomes broken.

BRIEF DESCRIPTION OF THE DRAWINGS

The present invention will be more clearly understood by reference to the accompanying drawings in which like reference characters refer to like parts within the several views, and wherein:

FIG. 1 is a fragmentary side plan view of the saw chain of the present invention;

FIG. 2 is a sectional view taken along line 2—2 in FIG. 1 and enlarged for clarity;

FIG. 3 is a fragmentary side plan view of the connection between the links and enlarged for clarity; and FIG. 4 is an exploded perspective view of the link connection of the present invention.

DETAILED DESCRIPTION OF THE PRESENT INVENTION

With reference now to FIG. 1 a saw chain 10 of the present invention is thereshown comprising saw tooth links 12, center links 14, connecting links 16 and link connecting pins 18. The pins 18 are illustrated as rivets in FIG. 1. In a fashion which will subsequently be described in greater detail, one end of each center link 14 is pivotally secured to and between one end of two connecting links 16 wherein the connecting links 16 are spaced and parallel and in alignment with each other. The other end of each center link 14 is similarly pivotally secured to and between one end of one saw tooth link 12 and one end of a single connecting link. The saw tooth links 12 are separated from each other by a pair of connecting links 16. In addition, adjacent saw tooth links 12 are secured on opposite sides of the chain saw 10.

As is best shown in FIGS. 2 and 4, the other end of the first center link 14 is disposed between a connecting link member 16 on one side, and a saw tooth link 12 on its other side, so that a throughbore of the center link 14 is in registration with a throughbore of each of the links 12 and 16 to enable the connecting pin 18 to be secured therethrough. A second center link 14 is disposed between the links 12 and 16 so that one of its throughbores is in registration with the other throughbore of the links 12 and 16 so that a pin 18 can be secured therethrough. A plurality of saw chain sections as described above are similarly connected together by the pins 18 so as to form a continuous circular saw chain. In the preferred embodiment of the saw chain of the present invention, consecutive saw tooth links 12 are disposed on opposite sides of the center links members 14, as shown in FIG. 1.

With reference to FIGS. 1 and 4, each saw tooth link 12 comprises an elongated body portion 40 and a blade portion 42 that extends upwardly from the body portion 40 and above the top of the connecting links 16 along the saw chain 10. An aperture 46 is formed through each longitudinal end of the body portion 40 of the saw tooth link 12. The portions 40 and 42 are preferably integrally constructed of any hardened metal so that a cutting edge 44 on the blade portion 42 maintains its sharpness and resists wear longer. Preferably, the entire saw tooth link 12 is made of carbide although a carbide insert 43 (FIG. 4) can alternatively be secured along the cutting edge 44. Due to the extreme hardness of carbide with respect to the material, typically wood, which is cut by the saw chain, the cutting edge 44 will rarely, if ever, need sharpening.

As best shown in FIG. 4, the connecting link 16 comprises an elongated body portion 50 with an aperture 52 formed at each longitudinal end. The center link 14 also includes an elongated body portion 54 with an aperture 56 formed at each longitudinal end. A driven dog portion 58 extends downwardly from the body portion 54 of the center link 14 and is engaged by the drive means of a chain saw device (not shown) in the conventional manner. Moreover, the apertures 52 and 56 are substantially the same size but the apertures 46 are slightly smaller for a reason to be hereinafter explained. In addition, since the links 16 and 14 are not subjected to the same shear stresses and wear as the cutting edge 44 of the saw tooth links 12, these links 14 and 16 are made of a nonhardened metal such as nonhardened steel. Nonhardened metal, moreover, is substantially less expensive than the hardened metal used with the previously known saw chains and thus reduces the overall cost of the saw chain 10 of the present invention.

In a modification of the invention, shown in FIGS. 2 and 4, the connecting pin 18 is detachable from the saw chain 10 to permit the individual replacement of the tooth links 12 when desired. More particularly, the connecting pin 18 comprises a female member 20 and a male member 22. The female member 20 includes a cylindrical sleeve 60 having a reduced diameter portion 61 at one end and an enlarged head 24 at the other end while the male member 22 includes an externally threaded shank 64 with an enlarged head 66 at one end. The sleeve 60 has a threaded axial bore 62 which threadably receives the shank 64. The male and female members 20 and 22 are positioned through the registering apertures in the opposite sides of the saw chain and the members 20 and 22 are screwed together. Upon tightening, the saw chain links are entrapped between the enlarged heads 24 and 66 of the member 20 and 22, respectively. An Allen head recess 34 is preferably provided in the enlarged heads 24 and 66 of both members 20 and 22 so that an Allen wrench can be used to tightly screw the members 20 and 22 together.

Replacement of an individual saw tooth is desirable, for example, when a saw tooth becomes broken or damaged.

Thus, the present invention provides a saw chain that is expensive in construction and yet rarely, if ever, requires sharpening. The present invention accomplishes this by the use of relatively inexpensive nonhardened material for the connecting and center links and the use of an extremely hard material, e.g. carbide, for the saw tooth link.

Having thus described my invention, many modifications thereto will become apparent to those skilled in the art to which it pertains without departing from the scope and spirit of the invention as defined in the appended claims.

I claim:
1. A saw chain comprising:
   a plurality of elongated center links;
   a plurality of elongated connecting links;
   a plurality of elongated saw tooth links;
   wherein said saw tooth links are constructed of an extremely hard material;
   wherein said center links and said connecting links are constructed of a nonhardened metal;
   wherein each center link has an aperture formed in each longitudinal end, each connecting line has an aperture formed in each longitudinal end and said saw tooth link has an aperture formed in each longitudinal end, and further comprising means for detachably connecting one end of at least one center link between one end of one saw tooth link and one end of one connecting link, said last-mentioned ends of said connecting link, saw tooth link and center link being positioned so that the apertures in said last-mentioned ends are in registry with each other, said detachable connecting means further comprising a female member having a sleeve portion positioned through said registering apertures and a male member which threadably engages said female member, said members each including an enlarged head whereby said links are entrapped between the enlarged heads; and
   wherein said apertures in said connecting links and said center links are substantially the same diameter and wherein said female member includes a cylindrical sleeve having an outer diameter substantially equal to the diameter of said last-mentioned apertures, said sleeve including an internally threaded axial bore, and further including a reduced diameter portion having substantially the same diameter as the diameter of said apertures in said saw tooth links, and said male member including an externally threaded shank which threadably engages said sleeve axial bore.

2. The invention as defined in claim 1 wherein at least a portion of said saw tooth links are constructed of carbide.

3. The invention as defined in claim 1 wherein the female member enlarged head is formed on one axial end of the sleeve, said sleeve being slightly longer than the width of said aligned links whereby the male member enlarged head upon tightening abuts against one end of the sleeve.

4. The invention as defined in claim 3 wherein an axial recess having a polygonal cross-sectional shape is formed in the enlarged head of both members.

5. The invention as defined in claim 1 wherein the male member enlarged head is positioned adjacent the saw tooth link whereby, upon removal of the male member, the saw tooth link can be slid off the sleeve without removing the sleeve from the connecting link and center link apertures.

* * * * *